United States Patent [19]
Hutchison

[11] Patent Number: 5,133,688
[45] Date of Patent: Jul. 28, 1992

[54] TENDON EXTRACTION SYSTEM

[76] Inventor: Louis C. Hutchison, 3300 Meade Ave., Las Vegas, Nev. 89102

[21] Appl. No.: 512,885

[22] Filed: Apr. 23, 1990

[51] Int. Cl.⁵ .............................................. A22B 3/08
[52] U.S. Cl. .................................. 452/172; 452/136; 452/160
[58] Field of Search ............... 17/1 G, 46, 52, 11.3; 452/172, 160, 127, 136

[56] References Cited

U.S. PATENT DOCUMENTS

| | | | |
|---|---|---|---|
| 584,381 | 6/1897 | Lowndes | 17/11.3 |
| 732,300 | 6/1903 | Hollender | 452/172 |
| 2,694,219 | 11/1954 | Mayer | 17/11.3 |
| 2,739,346 | 3/1956 | Martin et al. | 17/11.3 |
| 3,233,282 | 2/1966 | Segur | 17/16 |
| 3,277,516 | 10/1966 | Belknap | 17/11.3 |
| 4,137,605 | 2/1979 | van Rij et al. | 17/46 |
| 4,359,807 | 11/1982 | Adkison et al. | 17/1 R |
| 4,951,354 | 8/1990 | Callsen et al. | 17/46 |

Primary Examiner—Bruce M. Kisliuk
Assistant Examiner—Lawrence Cruz
Attorney, Agent, or Firm—Thorpe, North & Western

[57] ABSTRACT

This device is used to remove the tendon from a cut of meat and the meat product produced thereby. The device includes at least one blade which is capable of substantially surrounding the tendon. The tendon is pulled through the blade and the tissue which is in close proximity to the tendon without severing other tissue, allowing the cut of meat to remain substantially intact after the tendon is removed. The cutting blade may be a singular oval-shaped blade or may be two blades placed adjacent each other to form an opening through which the tendon can be pulled. The tendon can also be attached to a grasping device which pulls the tendon past the cutting edges. This grasping device can be attached to an actuator which moves it in a linear direction away from the cutting blade thus drawing the meat tissue adjacent the tendon into contact with the cutting edges of the blade. The actuator may be mechanically, hydraulically, or pneumatically powered.

33 Claims, 13 Drawing Sheets

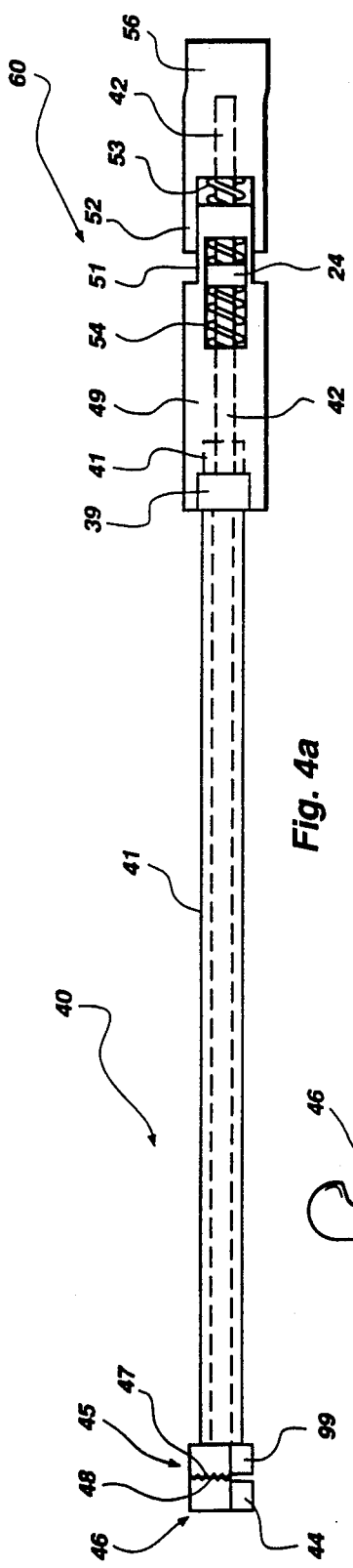
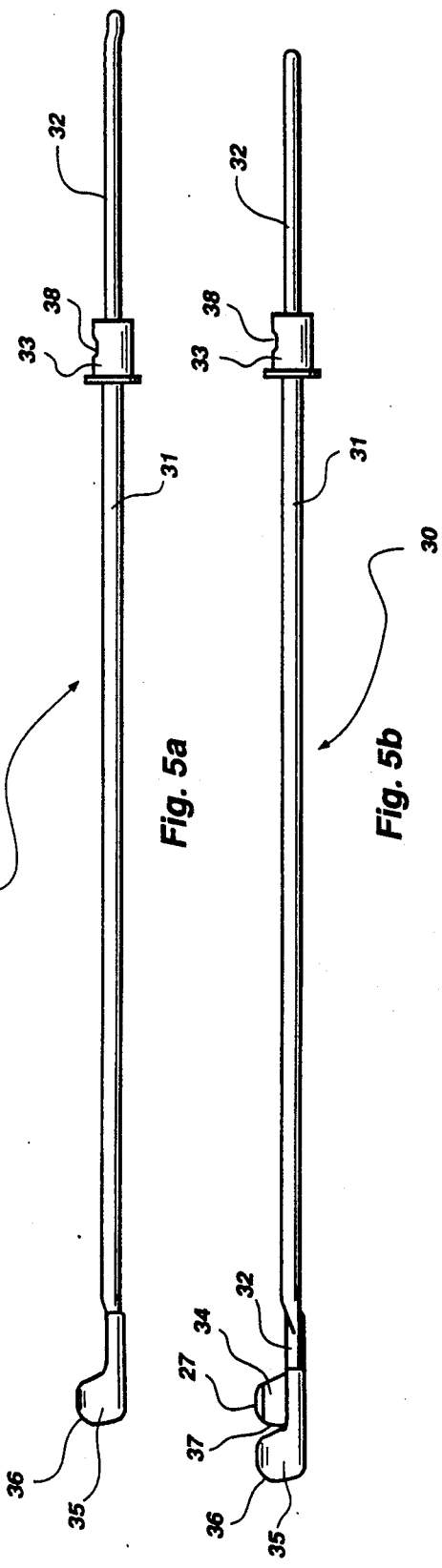
Fig. 4a
Fig. 4b
Fig. 5a
Fig. 5b
Fig. 5c

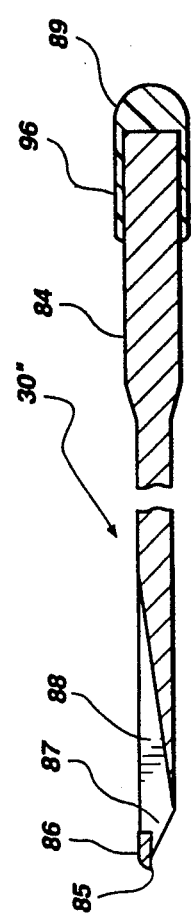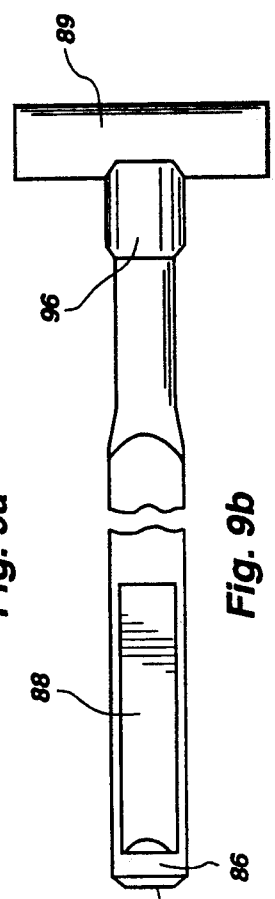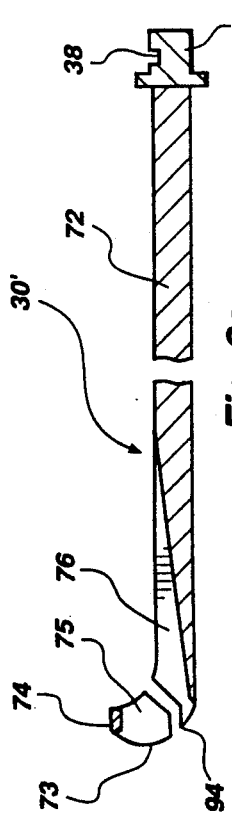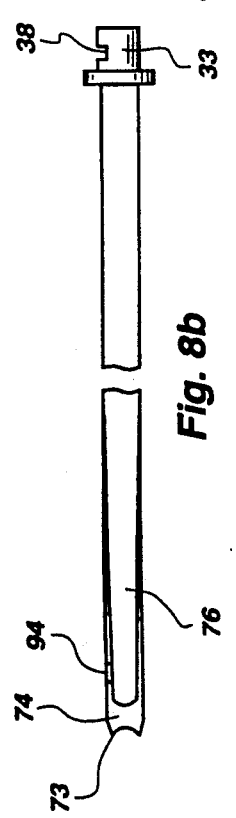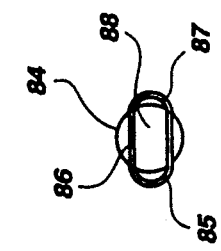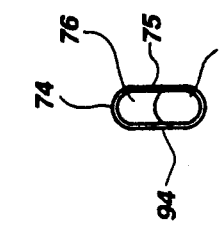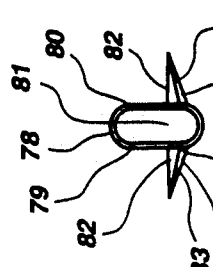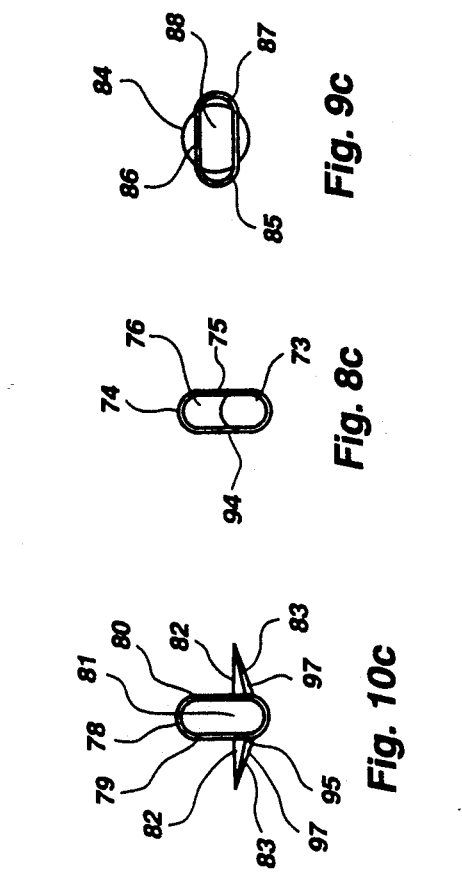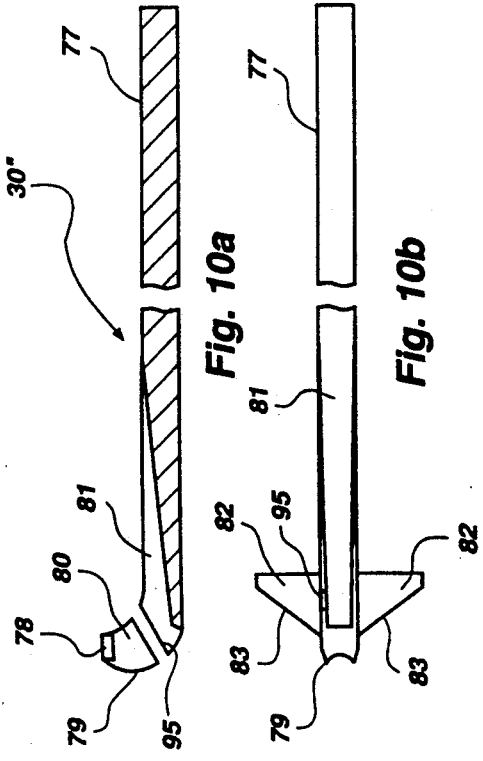

TENDON EXTRACTION SYSTEM

BACKGROUND OF THE INVENTION

1. Field of the Invention

The invention relates to devices and methods of extracting a tendon from its surrounding muscle tissue, and food products resulting therefrom.

2. Description of Related Art

The inherent existance of unsightly, tough, unpalatable, and difficult to remove tendons in various muscles and/or cuts of meat and poultry has created expensive and difficult problems for decades. The inability to remove tendons from particular cuts of meat and poultry in a satisfactory and economical manner has relegated many of the most tender, succulent, and desirable cuts thereof to the most undesirable and least demanded of meat or poultry products.

A primary example of the above problems is the tenderloin of a turkey. Although a tender and desirable portion of the white breast meat of the turkey, a large undesirable tendon extends directly through a major portion of the tenderloin.

There are presently only two methods being employed to remove tendons to improve the desirability of the meat products. The first method is to manually cut or trim the tendon from the meat with a knife. This method is tedious and time consuming, and therefore uneconomical. Also, when the tendon is removed in this manner, the meat is most generally separated into distinct pieces or portions, no longer maintaining its original integrity as a single portion, muscle or cut of meat.

The second presently used method is simply to grab the tendon with a pair of pliers and tear the tendon away from the meat. U.S. Pat. No. 584,381 to Lowndes discloses a pair of pliers adapted for this purpose. Even though this method is faster, more economical, and easier than the trimming method described above, it also leaves the cut of meat substantially separated into distinct pieces or portions. Since neither of the above methods for removing a tendon from a cut of meat leaves the cut intact, as a single portion, cut or muscle, the appearance, desirability and usefulness of the meat is greatly compromised. Also, because of the meat industry's inability to remove such tendons in a satisfactory manner, certain cuts of meat such as turkey tenderloins must be sold at a reduced price, or be reduced to smaller portions by removing the tendon(s) and sold in these smaller and irregularly shaped portions, thus limiting the usefulness thereof and reducing the marketable price.

Because of the greater desirability of intact, tendonless cuts of meat, there exists a need for a device which can quickly and efficiently remove the tendon while leaving the cut of meat itself substantially unaffected.

SUMMARY OF THE INVENTION

It is an object of the invention to provide tools and methods that may be incorporated into a device or devices which can remove the tendon from a cut of meat without otherwise negatively affecting the usefulness, desirability, appearance or marketability of the meat.

Another object of the present invention is to provide an apparatus and methods for removing the tendons from a cut of meat while leaving the remainder of the cut of meat intact.

Another object of the present invention is to provide an apparatus and methods for removing the tendons from a cut of meat while at the same time preparing the cut of meat for uses heretofore unavailable because of prior tendon removal methods.

The above and other objects of the invention are realized in a specific illustrative embodiment of a tendon extraction system which includes a tubular blade apparatus and a linear blade apparatus.

The tubular blade apparatus includes a cutting assembly comprised of a mounting block for attaching the apparatus to a table or the like, and a housing attached to the mounting block; an actuator assembly located inside the housing; a grabber assembly attached to the mounting block and movable in a linear direction by the actuator assembly; and a shear rod assembly attached to the mounting block having at least one cutting edge at its distal end capable of surrounding a tendon. A tendon surrounded by the cutting edges of the shear rod assembly is securely held by jaws of the grabber assembly and is pulled past the cutting edges when the grabber assembly is moved in a linear direction by the actuator assembly. The movement of the tendon through the cutting edges causes separation of the meat tissue from the tendon.

The linear blade apparatus comprises two blades having linear cutting edges securely mounted in parallel relationship such that a gap exists between the two cutting edges sufficiently large to accommodate the width of a tendon. The tendon is placed between the cutting edges and pulled therepast to separate the tendons from the adjacent meat tissue and to form a generally V-shaped opening in the cut of meat.

BRIEF DESCRIPTION OF THE DRAWINGS

The present invention will be further illustrated by reference to the following detailed description taken in conjunction with the accompanying drawings in which:

FIG. 4a is a top view of the grabber assembly and a portion of the actuator assembly of the tubular blade apparatus;

FIG. 4b is an end view of the assembly of FIG. 4a;

FIG. 5a is a side view of the shear rod assembly of the tubular blade apparatus;

FIG. 5b is a side view of the shear rod assembly of FIG. 5a with the blades in an open position;

FIG. 5c is an end view of the shear rod assembly of FIG. 5a;

FIGS. 8a, 9a and 10a are cross-sectional views of other embodiments of the shear rod assembly;

FIGS. 8b, 9b and 10b are top views of the embodiments of the shear rod assembly of FIGS. 8a, 9a and 10a;

FIGS. 8c, 9c and 10c are end views of the shear rod assembly of FIGS. 8a, 9a and 10a;

DESCRIPTION OF THE PREFERRED EMBODIMENTS AND BEST MODE FOR CARRYING OUT THE INVENTION

The tendon extractor system of the present invention includes a tubular blade apparatus 20 and a linear blade apparatus 100 which can be used individually or in combination to remove the tendon from common-cuts of meat while leaving the surrounding muscle tissue of the meat intact.

Figure 1:
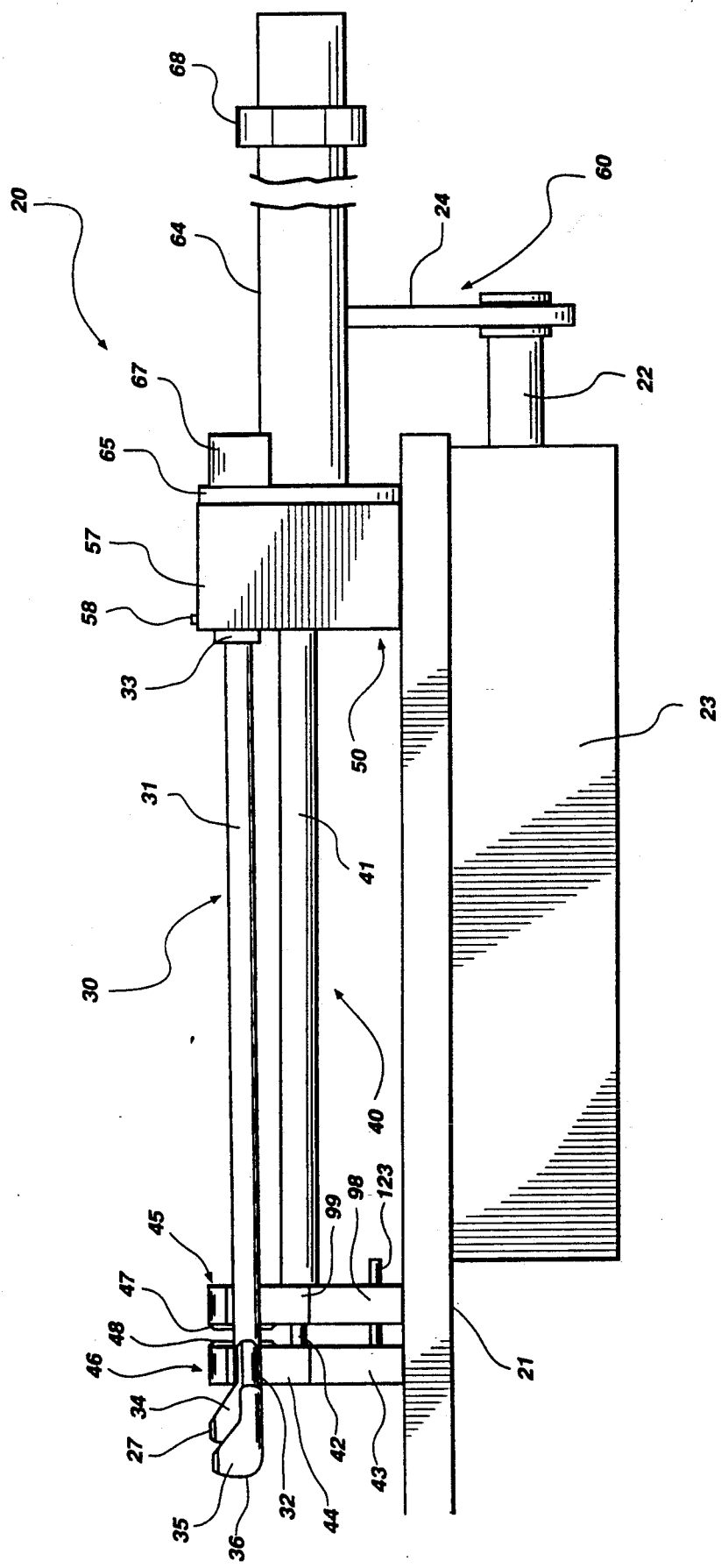
FIG. 1 is a side view of the tubular blade apparatus portion of the tendon extractor system of the invention.

The tubular blade apparatus 20 as best seen in FIG. 1, is comprised generally of a mounting assembly 50 which is mountable to a mounting plate 21 and to which is attached a shear rod assembly 30 having blades 34 and 35 for separating the tendon from the muscle tissue of the meat, grabber rod assembly 40 for securely holding the tendon and for pulling the tendon and attached cut of meat past the shear rod assembly 30, and an actuator assembly 60 which drives the grabber rod assembly 40 in a linearly reciprocating direction, and which opens and closes the blades 34 and 35 and the grabber 45 and 46. The actuator assembly 60 can be driven by a hydraulic piston 22 in conjunction with a hydraulic pressure generator 23, or may be driven manually or pneumatically by any mechanism (not shown) capable of moving actuator arm 24 in a linear reciprocating motion.

Figure 2:
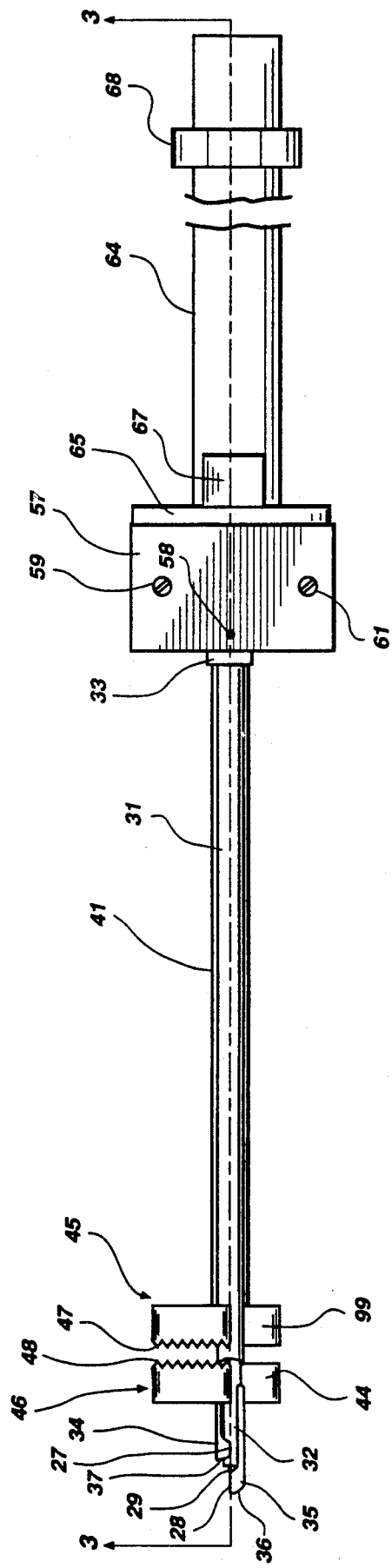
FIG. 2 is a top view of the tubular blade apparatus as shown in FIG. 1.

Mounting assembly 50 includes mounting block 57 which is attachable to mounting plate 21 by means of mounting screws 59 and 61 (as best seen in FIG. 2), and actuator housing 64 which is attached to the mounting block 57 by means of attachment ring 65, and attachment ring screws 66.

Figure 3:
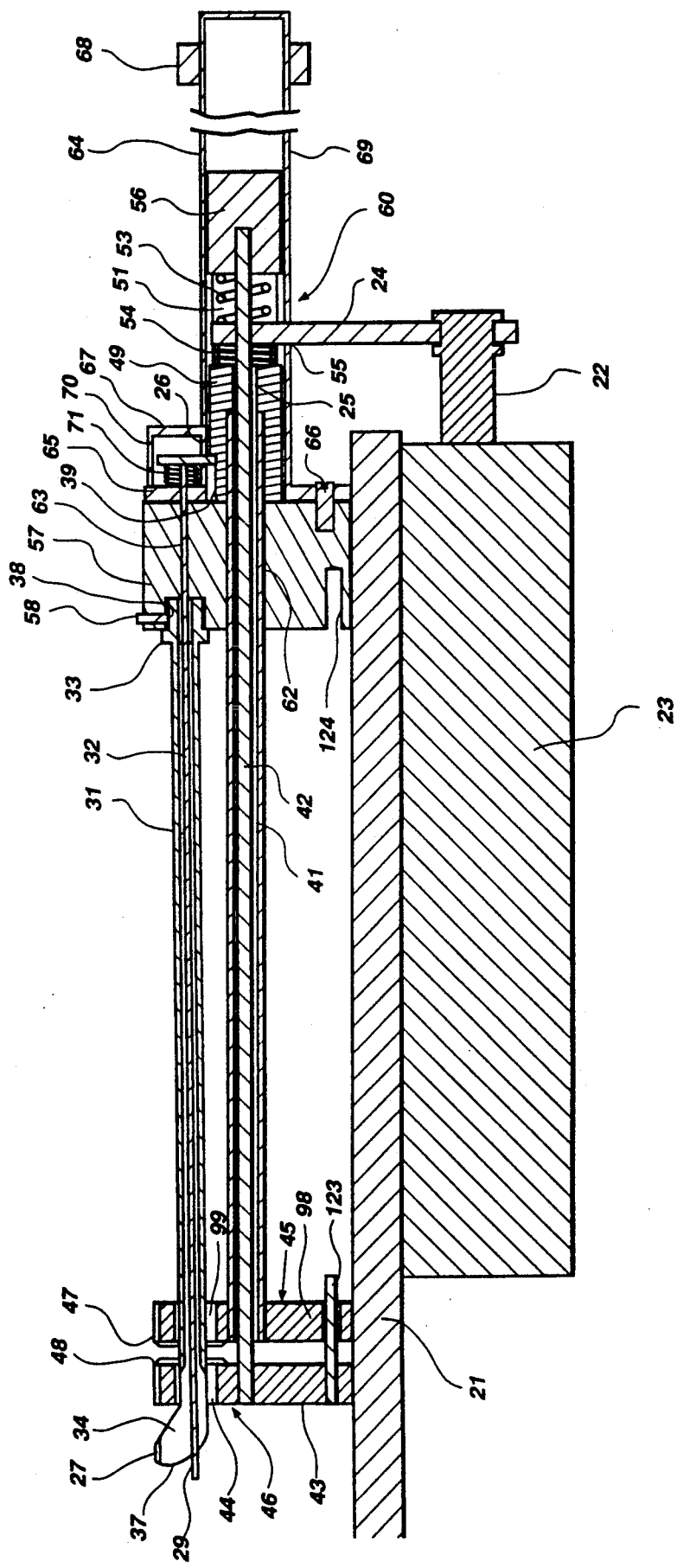
FIG. 3 is a cross-sectional view of the tubular blade apparatus portion of the invention taken along lines 3—3 of FIG. 2.

As best seen in FIG. 3, mounting block 57 includes shear rod channel 63 which allows the secure attachment of outer shear rod 31 by means of mounting ring 33 and mounting ring attachment screw 58, yet allows inner shear rod 32 to be movable therein. Grabber rod channel 62 allows for the outer grabber rod 41 and inner grabber-rod 42 to also pass through the mounting block 57 and attach to the actuator assembly 60. The grabber rod 41 and 42 are both free to move in a linear direction through channel 62 in response to movement of the actuator assembly 60. Mounting block 57 further comprises opening 124 for reception of the grabber alignment rod 123.

Housing 64 further comprises actuator arm stopping ring 68 and actuator arm opening 69. Opening 69 is shaped to allow the actuation arm 24 to pass in a linear direction therealong from the end 55 thereof to the stop ring 68. Opening 26 in housing 64 is covered by the shear rod actuator plate cover 67 which protects the portion of actuator assembly 60 which controls the opening and closing of blades 34 and 35 as will be explained below.

As best seen in FIGS. 5a, 5b and 5c, the actuator rod assembly 30 comprises a tubular outer shear rod 31 and a solid inner shear rod 32 which can move linearly therein. Outer shear rod 31 has a blade 34 attached to its distal end having cutting edge 37, and has attached to its proximal end, the mounting ring 33 which has notch 38 for securely attaching it to mounting block 57 by means of attachment screw 58. The inner shear rod 32 has attached to its distal end a blade 35 having cutting edge 36. The proximal end of inner shear rod 32 extends beyond the mounting ring 33 so that it can pass through mounting block channel 63. As best seen in FIG. 5c, blades 34 and 35 are of generally C-shaped configuration, and when placed in the closed position as shown in FIG. 5a, where the surfaces 27 and 28 are directly adjacent each other, the cutting edges 36 and 37 form an oval tubular-shaped cutting surface.

Figure 14:
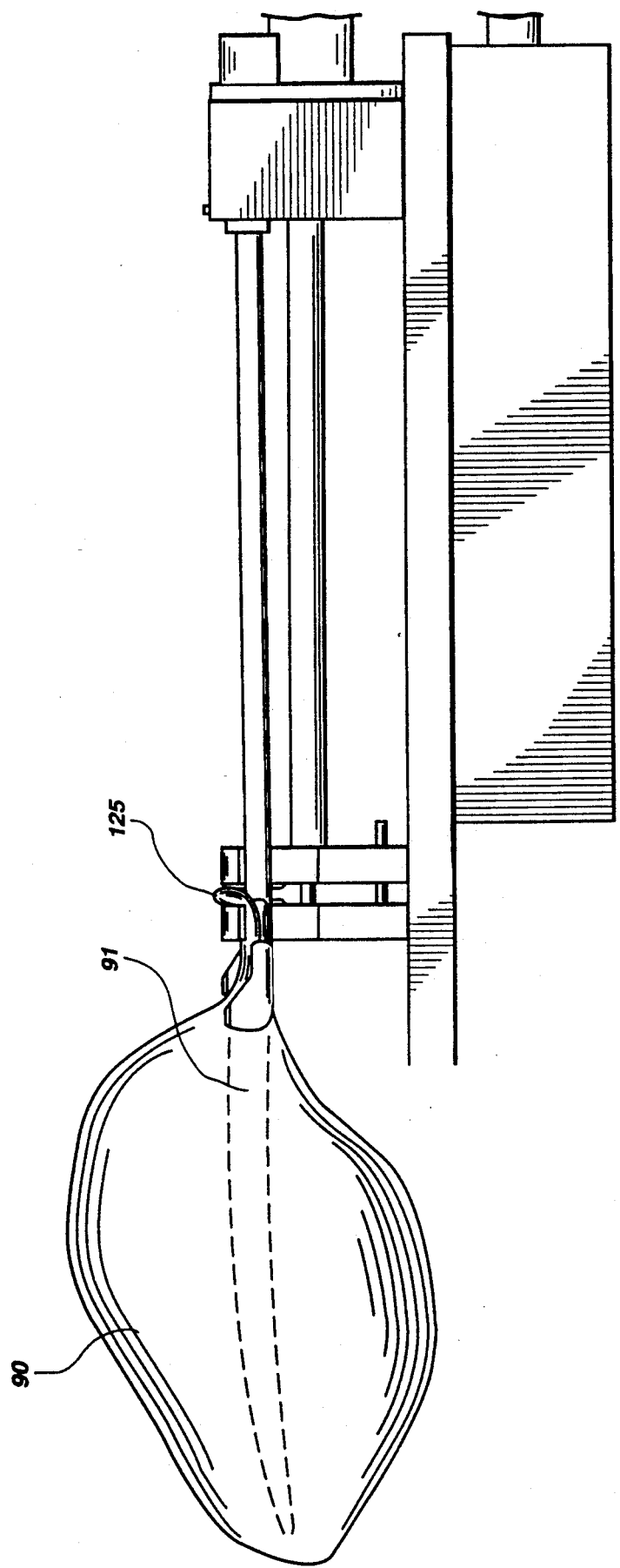
FIG. 14 is a side view of the tubular blade apparatus portion of the tendon extractor system having a cut of meat placed therein for removal of the tendon thereof.

As can be seen in FIG. 5b, when the blades 34 and 35 are in the open position, a tendon extending from a portion of a cut of meat (such as a tendon 91 extending from cut of meat 90 as shown in FIG. 14) can be easily placed between the blades 34 and 35. When a tendon is thus located, inner rod 32 is retracted through outer rod 31 and the blades 34 and 35 come to the closed position as shown in FIG. 5a. Thus, the split blade assembly 30 allows for easy placement of a tendon in the correct position in between cutting blades 36 and 37 without the difficult manipulation required to thread a tendon through the oval-shaped opening.

As best seen in FIG. 4a, the grabber assembly 40 comprises a tubular outer rod 41 and a solid inner rod 42 which is slidable therein. Lead grabber 45 attached to the distal end of tubular outer rod 41 and lag grabber 46 is attached to the distal end of inner rod 42. The grabbers 45 and 46 each comprise generally C-shaped openings 99 and 44 respectively which allow them to partially encircle rods 31 and 32 of the split blade assembly 30. The grabbers 45 and 46 also comprise legs 98 and 43 respectively and jaws 47 and 48 respectively. As best seen in FIG. 3, grabber leg 43 also comprises alignment rod 123 which passes through grabber leg 98 and prevents relative rotation of the two grabbers.

As best seen in FIG. 2, when blades 34 and 35 are in the open position, an access is created and a tendon can be placed therebetween and between grabber jaws 47 and 48. Upon linear movement of the grabber rod assembly toward the mounting block 57, the meat is first pulled against the blades 34 and 35 causing blade 35 to move to its closed position, then cutting edges 36 and 37 cut into the meat and remove the muscle tissue directly adjacent the exterior surface of the tendon.

As seen in FIG. 3, actuator assembly 60 is located inside housing 64. Lag actuator block 49 is rigidly attached to the outer grabber rod 41 and lead actuator block 56 is rigidly attached to inner grabber rod 42. Channel 25 in lag actuator block 49 allows inner grabber rod 42 to freely pass therethrough. Rod 42 also passes through actuator arm 24 and is slidable relative thereto.

As best seen in FIG. 4a, lag actuator block 49 also comprises a reduced diameter shoulder portion 51. Lead actuator block 56 also comprises a shoulder portion 52. The smaller diameter of shoulder 51 is sized to fit in a slidable manner within shoulder portion 52. Lead spring 53 encircles inner grabber rod 42 and is securely attached to lead block 56 at one of its ends, and to the actuator arm 24 at its opposite end. Lag spring 54 also encircles inner rod 42 and is securely attached to lag actuator block 49 at one of its ends and to actuator arm 24 at its opposite end. Therefore, movement of actuator arm 24 causes compression and/or extension of springs 53 and 54 which in turn causes movement of blocks 56 and/or 49. Since actuator block 56 is rigidly attached to inner rod 42, movement of block 56 caused by the force of spring 53 also causes movement of rod 42. Equivalently, outer grabber rod 41 is rigidly attached to actuator block 49 which moves in response to forces of spring 54.

The actuator rod 24 functions to move the entire actuator assembly 60 and grabber assembly 40 in a linear direction, and also functions to compress or extend its springs 53 and/or 54 to cause opening or closing of the grabber jaws 45 and 46.

Figure 6:
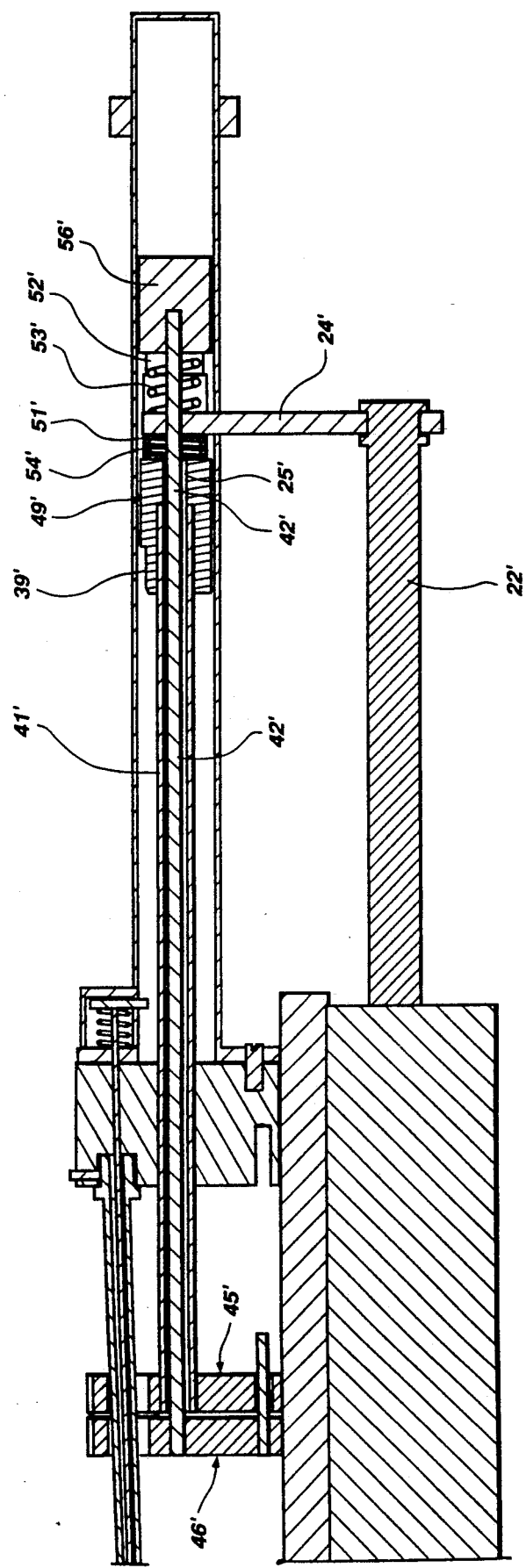
FIG. 6 is a cross-sectional view of the tubular blade apparatus showing the intermediate position of the actuator assembly.

Lag actuator block 49 also comprises a notch 39 which causes actuator plate 70 to push against inner rod 32 causing the rod to move blade 35 to the open position. As best seen in FIG. 3, the actuator plate spring 71 is compressed when lag actuator block 49 is located directly adjacent mounting block 57. As seen in FIG. 6, when actuator block 49 is moved away from mounting block 57, shoulder 39 no longer traps the actuator plate 70 and the actuator spring 71 pushes the plate against the cover 67.

Figure 7:
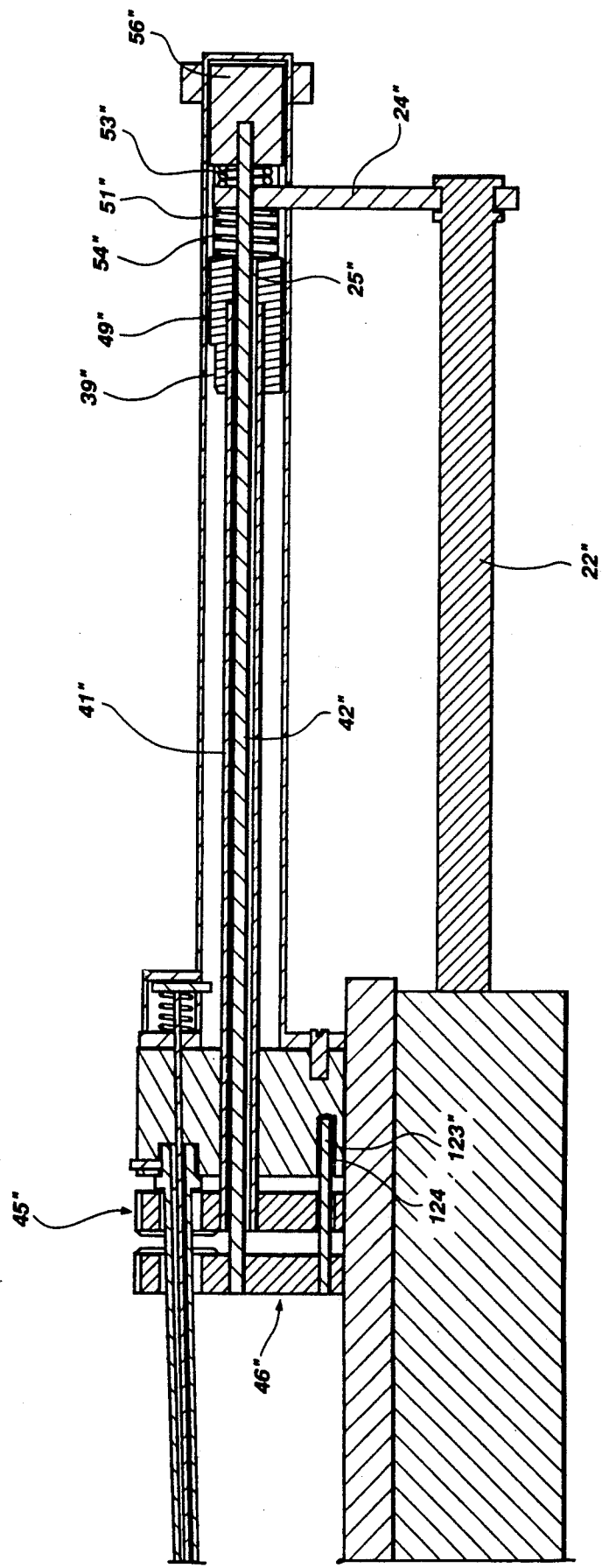
FIG. 7 is a cross-sectional view of the tubular blade apparatus showing the fully extended position of the actuator assembly.

Referring now to FIGS. 3, 6 and 7 wherein the three stages of operation of the actuator assembly are shown, it can be seen that in the initial or starting position (FIG. 3) actuator assembly 60 is located at its most forward position in housing 64, with actuator arm 24 in contact with end 55 of opening of 69, and with notch 39 forcing actuator plate 70 to completely compress spring 71 and move inner rod 32 forward to open blade 35. In this starting position, lag spring 54 is completely compressed forcing lag actuator block 49 to press against mounting block 57, and lead spring 53 is extended forcing lead actuator block 56 to abut against lag actuator block shoulder 51 to force the grabbers 45 and 46 to their open position. In FIG. 6 primes (') are used behind the reference numerals to designate the same component parts as in FIG. 3 but in a different position, and in FIG. 7 double primes ('') are used behind the reference numerals to designate the same component parts as in FIG. 3 but in a still different position; thus, for example, actuator arm 24 in FIG. 3 is the same actuator arm 24' in FIG. 6 and actuator arm 24'' in FIG. 7, shown in different positions.

When actuator arm 24 begins to move from its most forward position back toward stop ring 68, the compression of spring 54 is gradually released and the tension on spring 53 is gradually lessened. Further movement of actuator rod 24 simultaneously causes lead spring 53 and lag spring 54 to reverse their compression/tension state (i.e., lead spring 53 becomes slightly compressed and lag spring 54 becomes slightly tensioned). At this point, lag block 49 moves away from its abutment with mounting block 57, and simultaneously, lead block 56 is pushed away from shoulder 51 causing grabber 46 to close in abutting relationship with grabber 45. Continued movement of actuator arm 24 causes the entire actuator assembly 60 and grabber assembly 40 to translate while the mounting assembly 50 and the split blade assembly 30 remains stationary.

Once the grabbers 45 and 46 are in the closed position, all components of the actuator assembly 60 and grabber assembly 40 remain stationary relative to each other (as seen by FIG. 6) during translation of the actuation arm 24 toward the stop ring 68. When lead actuator block 56 abuts the end of housing 64 and grabber alignment rod 123 bottoms in opening 124 of mounting block 57, movement of lead block 56 along with inner rod 42 and grabber 46 is prevented. However, actuator rod 24 continues its motion until it abuts against stop ring 68 (FIG. 7). This continued motion of actuator arm 24 causes lead spring 53 to be compressed and shoulder 51 to abut against lead block 56 due to tension in spring 54. The result is grabber 45 being pulled out of its abutting relationship with grabber 46 and back into an open position.

Position 1 of the actuator assembly as shown in FIG. 3 therefore causes blade 35 to open to allow a tendon to be placed therein and causes grabbers 45 and 46 to separate to allow the end of the tendon to be placed in jaws 47 and 48. As the actuator assembly 60 moves to its second position as best seen in FIG. 6, the grabbers 45 and 46 are closed on the end of the tendon and pull the tendon toward the mounting block 57 causing the tissue surrounding the tendon to force blade 35 to close with blade 34 and the cutting edges 36 and 37 to sever the tissue surrounding the tendon as they are pushed into the meat. As the actuator assembly 60 approaches the end of housing 64, grabber 46 stops while grabber 45 continues a short distance to separate the two grabbers and allow removal of the end of the tendon. In this position, as best shown by FIG. 7, the tendon has been separated from the surrounding meat tissue a distance equivalent to the distance traveled by the actuator assembly 60.

As shown in the above-noted drawings, actuator arm 24 is moved by means of piston 22 in conjunction with hydraulic pressure generator 23. However, as would be readily apparent to those of ordinary skill in the art, actuator arm 24 could be adapted to be driven by any well-known means, either manual or automatic such as hydraulics, pneumatics, electric motors, etc.

FIGS. 8a, 8b and 8c show another embodiment of the blade assembly of the tubular blade apparatus 20. Blade assembly 30' comprises a shaft 72 which may be solid as shown in FIG. 8a or which may be tubular, and a blade 75 having an oval-shaped cutting edge 73 and bridge member 74. At the end opposite blade 75, a mounting ring 33 can be attached in order to allow the blade assembly 30' to be securely attached in channel 63 of mounting block 57 by means of attachment screw 58.

In operation, blade assembly 30' functions similarly to the split blade assembly 30 except that there is no open position to allow a tendon portion of a cut of meat to be laid in between the blades. Instead, access opening 94 is located in the side of blade of 75 and is of a dimension sufficiently large to allow the tendon to pass therethrough into the opening 76.

Figure 22:
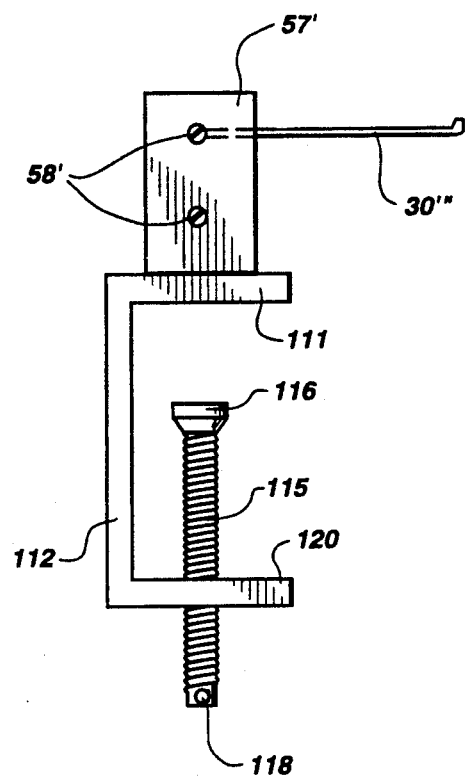
FIG. 22 is a side view of another embodiment of the tubular blade apparatus portion of the tendon extractor system of the invention.
Figure 23:
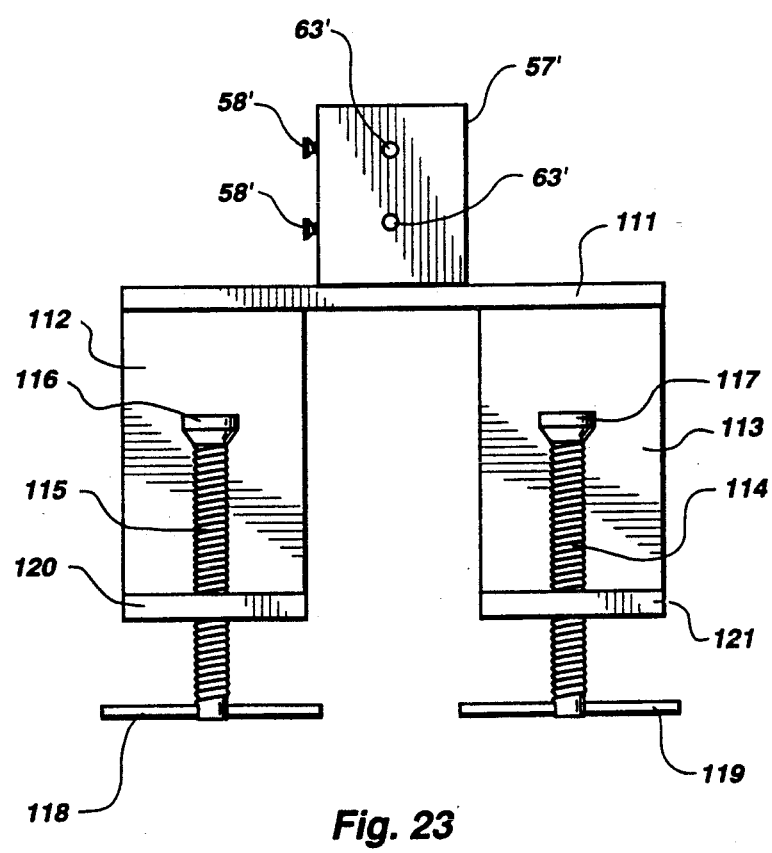
FIG. 23 is a front view of the tubular blade apparatus of FIG. 22.

Since blade assembly 30' has no inner rod equivalent to inner rod 32 of split blade assembly 30, no portion of the blade assembly 30' exists to be acted upon by actuator plate 70. Because of this, mounting block 57 may be formed in a much simpler version as is shown in FIGS. 22 and 23 as will be explained below.

FIGS. 9a, 9b and 9c show a blade assembly 30" having a shaft 84 and blade 87, the shaft 84 being either solid or tubular in construction. As can be seen, the end of the shaft containing the blade 87 is formed into a shape having a generally oval cross-section. Blade 87 is therefore oval in shape as is cutting edge 85, the oval shape being oriented in a longitudinal direction, as opposed to the vertical orientation of the oval cutting opening 76 of FIG. 8c.

Blade assembly 30" can also comprise a handle 89 attached to its end opposite the blade 87 which adapts the blade assembly 30" for manual use. Handle 89 can be made of metal, plastic or wood, and can have a securing portion 96 which may be glued, welded or otherwise secured to the shaft 84.

FIGS. 10a, 10b and 10c show a blade assembly 30''' having a shaft 77, a blade 80 having a bridge member 78 and a cutting edge 79, and an access opening 95 through one side of the blade 80 to allow for placement of a tendon into opening 81. As best seen in FIGS. 10b and 10c, blade assembly 30''' also comprises wing members 82 which are attached to the outer surface of blade 80. Wing 82 may be attached in a symmetrical orientation on directly opposite sides of blade 80 as shown in FIGS. 10b and 10c, or be attached in other locations around blade 80 in a symmetrical orientation, or any number of blades 82 may be attached at any location around the outer surface of blade 80.

Wing 82 comprises an angled surface 97 which includes cutting edge 83. As can be readily seen, the passage of blade assembly 30''' into a cut of meat not only cuts the tissue away from the tendon inserted into opening 81, but also makes a slit or a plurality of slits in the tissue directly adjacent the tendon as it passes therethrough. Wing 82 may also be used in conjunction with blade assembly 30" or 30', or with split blade assembly 30 in the same manner and for the same purpose as described for blade assembly 30'''.

The end of blade assembly 30''' opposite blade 80 may also include an attachment ring 33 to allow its attachment to the tubular blade apparatus 20, or may include handle 89. Likewise, blade assembly 30" may include attachment ring 33 in lieu of handle 89, and blade assembly 30' may include a handle 89 in lieu of attachment ring 33.

Figures 11, 12:
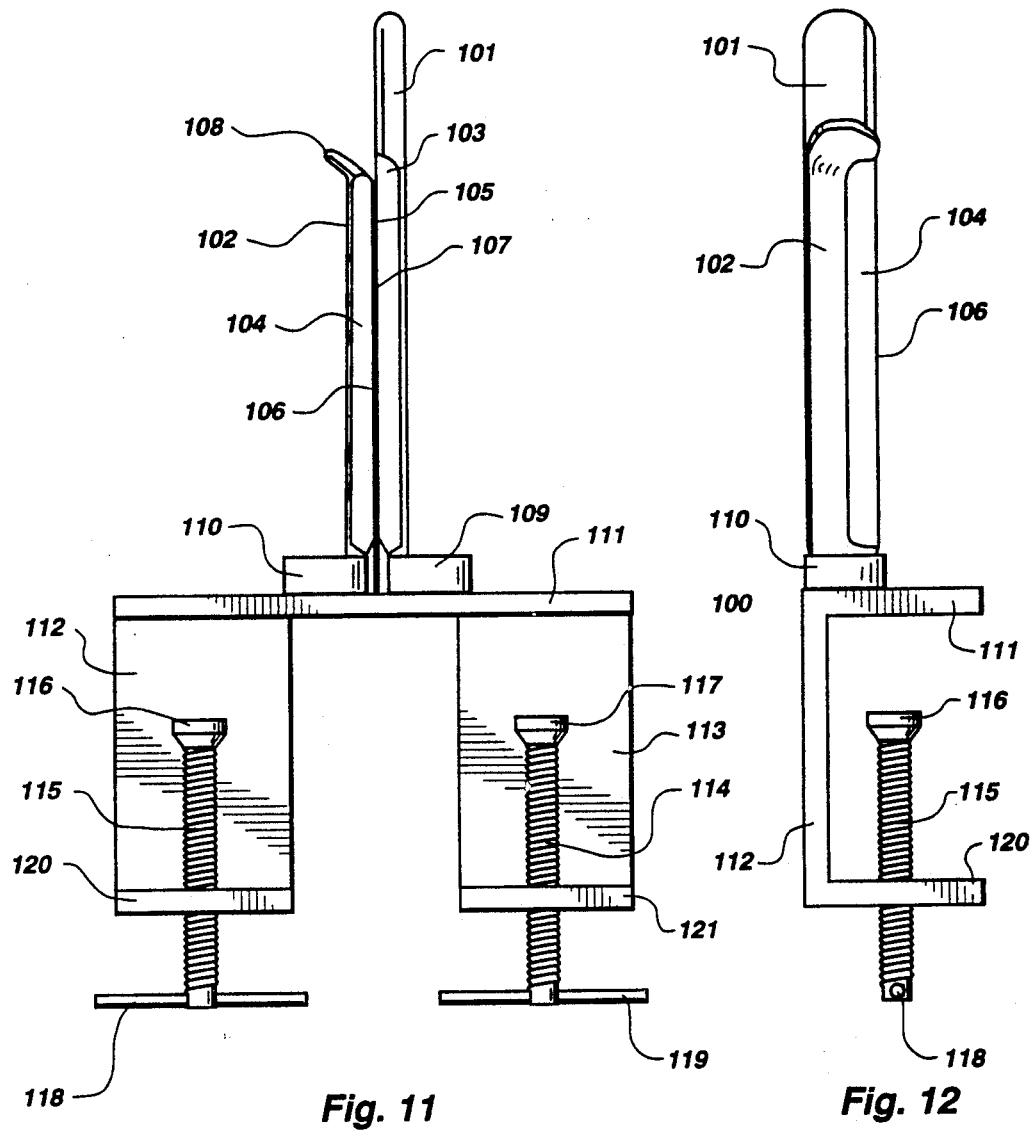
FIG. 11 is a front view of the linear blade apparatus portion of the tendon extractor system of the invention.
FIG. 12 is a side view of the linear blade apparatus of FIG. 11.
Figure 13:
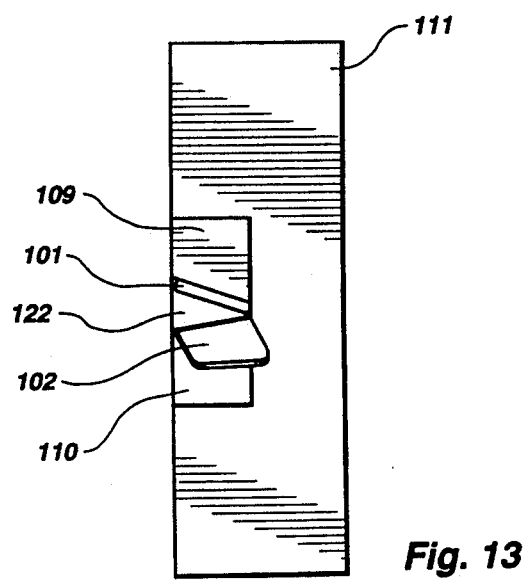
FIG. 13 is a top view of the linear blade apparatus of FIG. 11.

Tubular blade apparatus 20 may also be used in conjunction with linear blade apparatus 100 as shown in FIG. 11. The linear blade apparatus 100 includes a first blade 101 having a beveled portion 103 and cutting edge 105, and a second linear blade 102 having a beveled surface 104 and cutting edge 106. First blade 101 and second blade 102 are attached to the surface of support plate 111 by means of blade mounting braces 109 and 110, and mounting wedge 122 (best seen in FIG. 13). Mounting braces 109 and 110 are shaped such that the bottom portion of first blade 101 and second blade 102 can lie flush thereagainst and blade mounting wedge 122 can be inserted therebetween to force the first and second blades against the brace members 109 and 110 respectively and securely hold them in place in an upright position on the support plate 111. As can be seen in FIG. 11, blades 101 and 102 are mounted such that cutting edges 105 and 106 are separated by a small distance to form opening 107. Opening 107 is adjusted to allow for a tendon of a cut of meat to be placed between cutting edges 105 and 106. The distal portion 108 of blade 102 is bent away from blade 101 to form an access area for easy placement of a tendon into opening 107. A cut of meat is placed adjacent blade 102 and an extending portion of the tendon is laid on the bent distal portion 108 of the blade 102, and slid therealong until it drops into opening 107. The tendon is then pulled past blades 105 and 106 causing the tissue adjacent the tendon to be cleanly severed away.

Support plate 111 is attached to support members 112 and 113 which are in turn attached to support legs 120 and 121 to create a C-shaped configuration as best seen in FIG. 12. Screws 114 and 115 are located in support legs 120 and 121 and comprise clamp heads 116 and 117 and adjustment handles 118 and 119. As can be readily seen, the support plate 111 can be placed on top of mounting plate 21 with support arms 112 and 113 passing below the edge thereof, and screws 114 and 115 can be tightened to the bottom surface to securely fasten the blade apparatus 100 to the mounting plate 21.

As best seen in FIGS. 22 and 23, a simplified mounting block 57' may be mounted to support plate 111 in lieu of the linear blades 101 and 102. Block 57' comprises at least one foreshortened channel 63' for holding a mounting ring 33 or an end 77 (as best seen in FIGS. 8 and 10) of a cutting blade 30' or 30'''. Set screw 58' communicating with channel 63' to secure the blade 30' in place therein as in the manner described previously with respect to mounting block 57.

As best seen in FIG. 14, the tubular blade apparatus 20, having a split blade assembly 30, operates by first opening blade 35 and inserting a tendon 91 between the blades 34 and 35 and into the jaws 37 and 38 of grabbers 45 and 46. Actuator arm 24 is then moved in a direction away from the mounting block 57 causing the grabbers 45 and 46 to move to their closed position and securely grasp the end 125 of the tendon 91. Continued motion of the actuator arm 24 causes the meat 90 to press against open blade 35 and moves it to its closed position. Further movement of arm 24 causes grabbers 45 and 46 to pull the tendon in the direction of the mounting block 57. This motion causes the cutting edges 36 and 37 to cut away the meat tissue that is adjacent the tendon.

Figure 15:
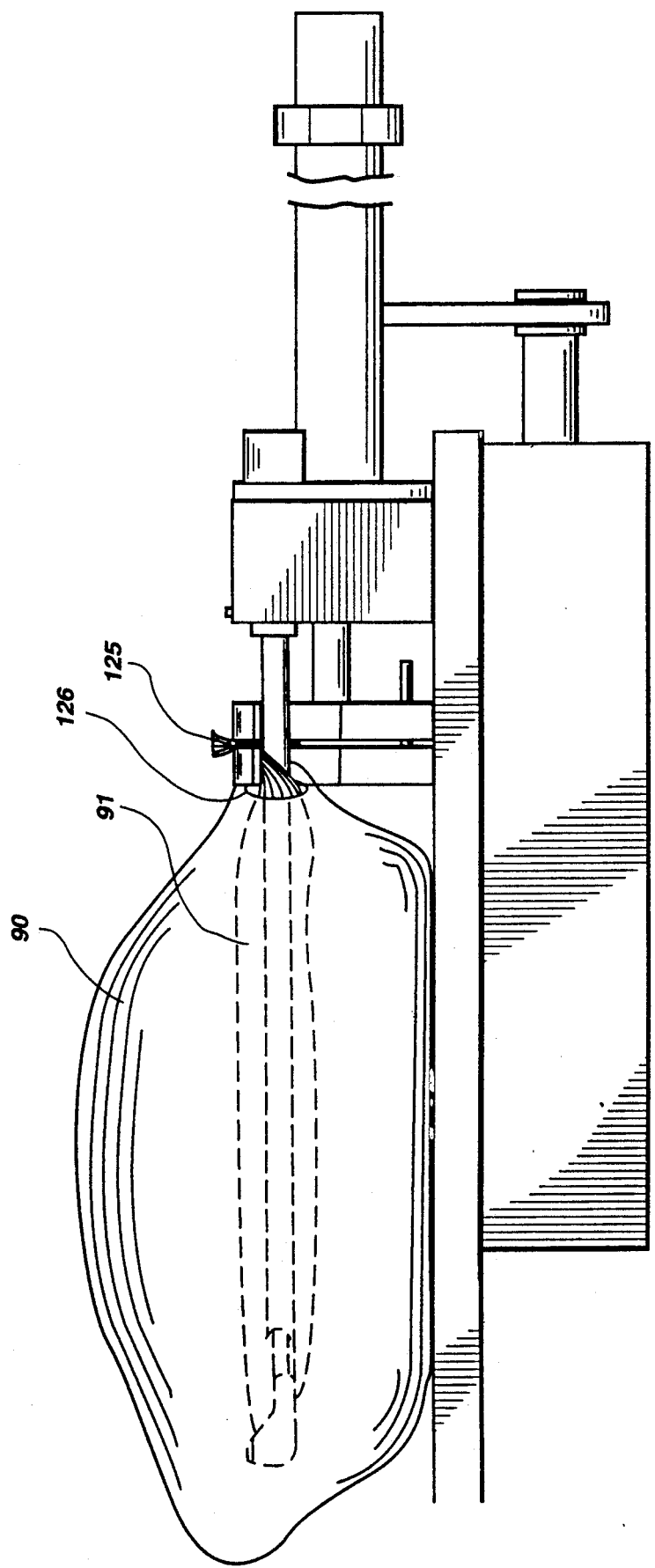
FIG. 15 is a side view of the tubular blade apparatus with the tendon cut away from the meat tissue.

As can be seen in FIG. 15, when the grabber assembly 40 is moved toward the mounting block 57, the tendon 91 is effectively separated from its surrounding muscle tissue. Once the tendon is separated it can be easily extracted from the cut of meat 90 by pulling the meat away from the blade assembly 30. After this process is complete, the only visible change to the cut of meat 90 is a small opening 126. The remainder of the cut of meat remains completely intact.

The very clean and complete removal of the tendon 91 from its surrounding muscle tissue is possible because of the close placement of the cutting edges 36 and 37 to the surface of the tendon 91, and because of the relative toughness of the tendon 91 with respect to the surrounding muscle tissue. The edges 36 and 37 of the blade pass along the surface of tendon 91, yet cut away only the much softer muscle tissue leaving the tendon 91 itself uncut.

Figure 16:
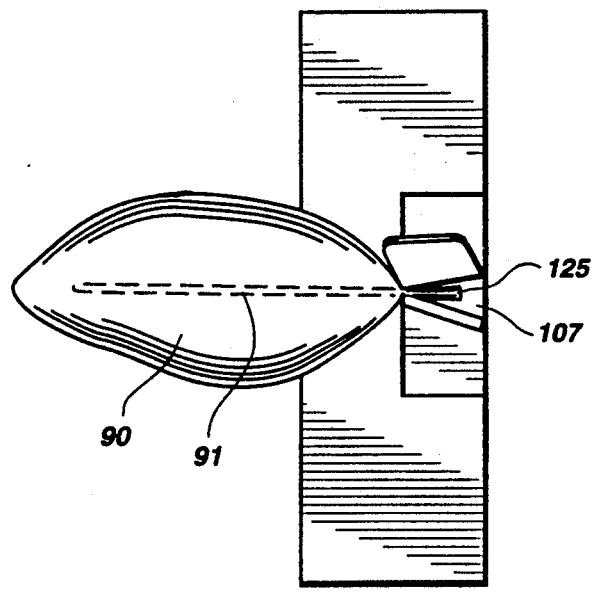
FIG. 16 is a top view of the linear blade apparatus portion of the tendon extractor system having a cut of meat placed therein for removal of the tendon thereof.
Figure 17:
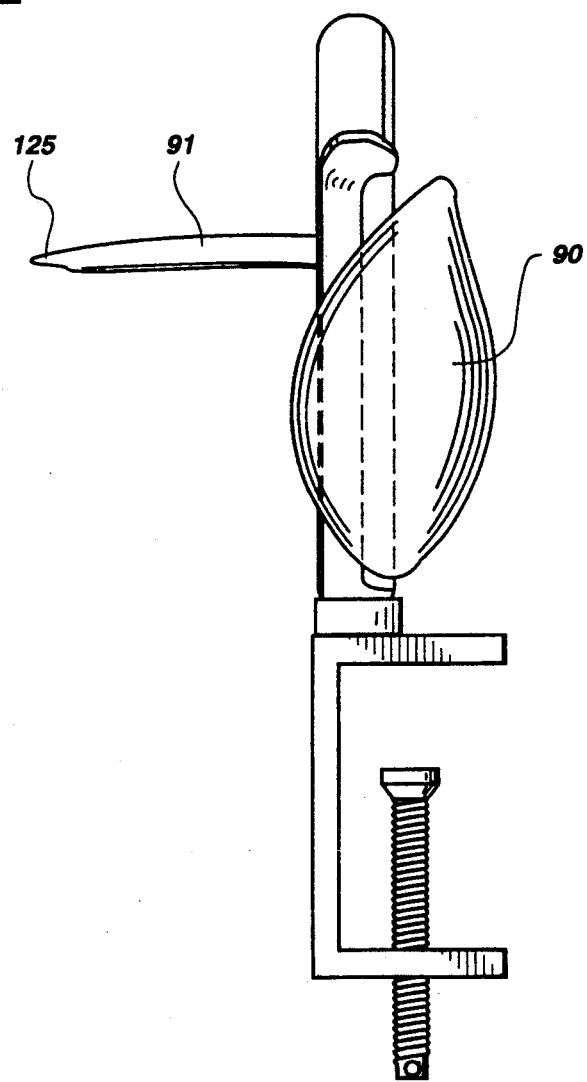
FIG. 17 is a side view of the linear blade apparatus portion of the tendon extractor system with the tendon cut away from the meat tissue.
Figure 18:
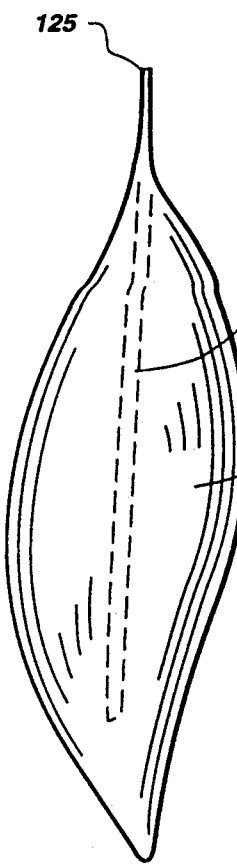
FIG. 18 is a perspective view of a cut of meat such as a turkey tenderloin showing the general location of the tendon portion.
Figure 19:
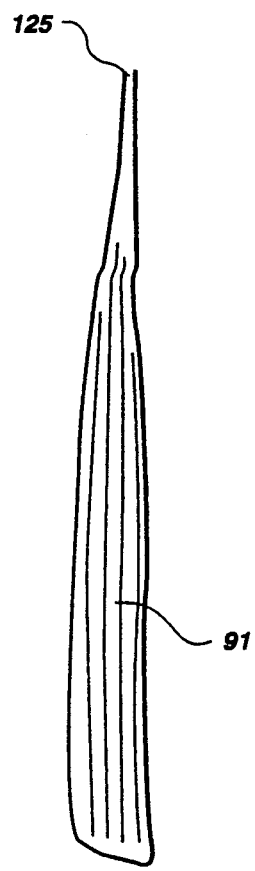
FIG. 19 is a perspective view of the tendon.
Figure 20:
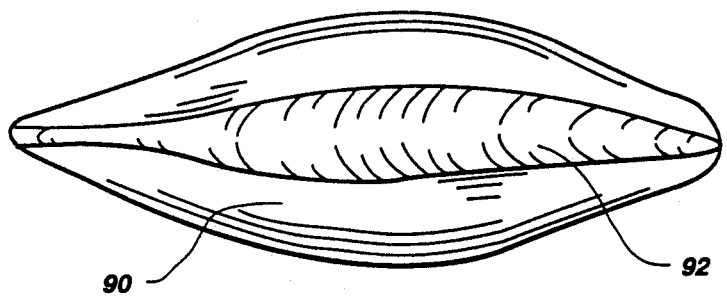
FIG. 20 is a perspective view of the cuts of meat as shown in FIG. 18 after the tendon has been removed by one of the removal processes of the invention.
Figure 21:
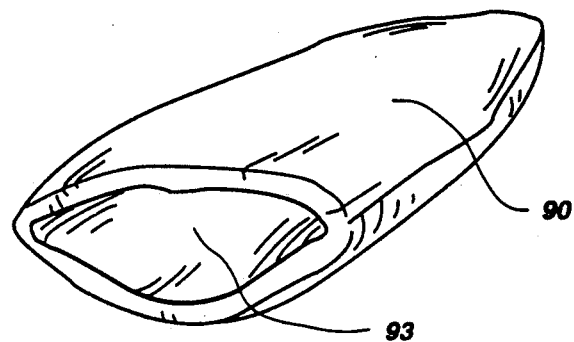
FIG. 21 is a perspective view of a cut of meat as shown in FIG. 14 after a tendon has been removed by another of the removal processes of the present invention.

As shown in FIG. 16, the linear blade apparatus 100 removes a tendon 91 from a cut of meat 90 by placing the tendon on the bent portion 108 of blade 102 to align it for access to channel 107 and then sliding it down into channel 107. The end 125 is then grasped by a pliers or the like and pulled past the cutting edges 105 and 106. As best seen in FIG. 17, the cut of meat 90 tends to rotate slightly (about 90 degrees) when the tendon 91 is pulled past the cutting edges 105 and 106. Thus, when the tendon 91 is completely removed, the cut of meat 90 is not severed into sections, but instead remains intact as a single piece of meat having only a V-shaped opening 92 (as shown in FIG. 20) along one surface thereof.

Although cutting edges 105 and 106 are not formed in the shape of the tendon as are the cutting edges in the tubular blade assembly 20, they are sufficiently close together that the channel 107 forces the tendon to be flattened out as it passes between the blades. This extremely narrow channel 107 therefore effectively causes blades 105 and 106 to substantially surround the tendon, leaving only a width of the channel 107 that can pass tissue therethrough without being cut by the blades. This small area of tissue is ineffective to hold the tendon 91 and readily releases from the tendon 91 as it is pulled through the channel 107.

If a tubular blade assembly 30 which has winged blades 82 attached thereto is used in the tubular blade apparatus 20, the winged cutting edges 82 sever muscle tissue as the blade moves along the tendon 91. This causes a larger opening, or pocket 93, to be formed in the meat 90. An opening such as pocket 93 may be desirable for a variety of end uses for the meat product.

Some cuts of meat may require the use of both the tubular blade apparatus and the linear blade apparatus in order to effectively remove all the tendonous material from the cut of meat. For example, large tendons extending into the tissue of the meat may be removed by the tubular blade apparatus 20 and then the linear blade apparatus 100 may be used to remove other tendons which extend only a short distance into the muscle tissue or which lie along the surface thereof.

As can be readily seen, the blades of the tubular blade assemblies can be sized to accommodate varying sizes of tendons in various cuts of meat. As also can be readily seen, the size of the blades also dictates how much of the meat tissue is removed along with the tendon, or alternatively, how much of the tendon gets cut away from the major portion of the tendon and remains in the meat tissue. Those of ordinary skill in the art will therefore be able to adjust the blade size in order to generate the desired finished product based on the percentage of meat tissue remaining on the removed tendon, and/or on the amount of tendon remaining in the meat tissue after the majority of the tendon is removed. The decision as to the type and size of blade used to remove tendons from the cut of meat is therefore based upon the intended final use of the meat product.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for separating a tendon from its surrounding muscle tissue comprising
    blade means having a proximal end and a distal end, said distal end having sharp cutting edges capable of passing into and severing the muscle tissue around the tendon without tearing said tissue, said cutting edges forming a narrow channel in said blade means for receiving said tendon therein, said channel being capable of substantially surrounding a portion of the tendon with said cutting edges in close placement to the surface of the tendon when said tendon is placed therein,
    supporting means, attached to the blade means, said supporting means having a proximal end and a distal end, and
    means for causing relative movement between said blade means and the tendon, whereby said relative movement causes said blade means to cleanly sever the tendon from its surrounding muscle tissue.

2. A system according to claim 1 further comprising handle means attached to the proximal end of said supporting means.

3. A system according to claim 1 wherein the portion of said blade means forming said channel also including channel access means, whereby placement of a tendon into said channel is facilitated by said channel access means.

4. A system according to claim 3 wherein said channel access means comprises a slot in said blade means extending from said proximal end to said distal end thereof, whereby a tendon may access said channel through said slot.

5. A system according to claim 3 wherein said blade means comprises a first blade and a second blade, said first and second blades being separated from each other by said channel and said channel access means allowing access to said channel between said first and second blades.

6. A system according to claim 5 wherein said first blade is movable from a first position to a second position relative to said second blade and said channel access means has an open position and a closed position, whereby when said first blade is in said first position said channel access means is closed, and when said first blade is in said second position, said channel access means is open.

7. A system according to claim 6 wherein said supporting means comprises a solid shaft attached to said first blade at a distal end thereof, and a tubular shaft having said second blade attached at a distal end thereof, said solid shaft being slidably mounted inside said tubular shaft, whereby movement of said solid shaft inside said tubular shaft causes said first blade to move between said first and second positions.

8. A system according to claim 1 wherein said cutting means further comprises cutting wings, whereby said relative movement causes said cutting wings to sever muscle tissue.

9. A system according to claim 7 further including means for causing relative movement between said blade means and the tendon, said means for causing relative movement between said blade means and the tendon comprising means for grasping said tendon, and actuator means attached to said grasping means for moving said grasping means in a linear reciprocating motion.

10. A system according to claim 9 wherein said grasping means comprises a first grabber and a second grabber, said first grabber and said second grabber having an open position and a closed position, whereby a tendon can be placed between said first and second grabbers when in said open position and is securely held in place between said first and second grabbers in said closed position, said first and second grabber being movable between said open position and said closed position by said actuator means.

11. A system according to claim 9 wherein said actuator means also moves said first blade from its closed position to its opened position.

12. A system according to claim 10 wherein said grasping means further comprises a solid shaft having a proximal end and a distal end and a tubular shaft having a proximal end and a distal end, said solid shaft being slidably mounted inside said tubular shaft, the distal end of said solid shaft being attached to said first grabber and the distal end of said tubular shaft being attached to said second grabber and the proximal end of said solid shaft and said tubular shaft being attached to said actuator means, whereby said actuator means causes movement of said solid shaft relative to said tubular shaft to move said first and second grabbers between their opened and closed positions.

13. A system according to claim 12 wherein said actuator means moves said grasping means through a beginning phase of motion wherein said first and second grabbers are adjacent said blade means in their open position and are moved to their closed position, an intermediate phase of motion wherein said grabbers remain in their closed position and move in a linear direction away from said blade means, an ending phase of motion where said first and second grabbers are again moved to their open position, and a return phase of motion wherein said first and second grabbers are moved in a linear direction until they are again adjacent said blade means.

14. A system according to claim 13 wherein said actuator means moves said first blade to its open position during said return phase of motion.

15. A system according to claim 13 wherein said actuator means further comprises a power source.

16. A system according to claim 15 wherein said power source is mechanical.

17. A system according to claim 15 wherein said power source is hydraulic.

18. A system according to claim 15 wherein said power source is pneumatic.

19. A system according to claim 1 wherein said supporting means for causing relative movement between said blade means and the tendon comprises means for grasping said tendon, and actuator means attached to said grasping means for moving said grasping means in a linear reciprocating motion.

20. A system according to claim 19 wherein said grasping means comprises a first grabber and a second grabber, said first grabber and said second grabber having an opened position and a closed position, whereby a tendon can be placed between said first and second grabbers when in said open position and is securely held in place between said first and second grabbers in said closed position, said first and second grabber being movable between said opened position and said closed position by said actuator means.

21. A system according to claim 20 wherein said grasping means further comprises a solid shaft having a proximal end and a distal end and a tubular shaft having a proximal end and a distal end, said solid shaft being slidably mounted inside said tubular shaft, the distal end of said solid shaft being attached to said first grabber and the distal end of said tubular shaft being attached to said second grabber and the proximal end of said solid shaft and said tubular shaft being attached to said actuator means, whereby said actuator means causes movement of said solid shaft relative to said tubular shaft to move said first and second grabbers between their open and closed positions.

22. A system according to claim 21 wherein said actuator means moves said grasping means through a beginning phase of motion wherein said first and second grabbers are adjacent said blade means in their open position and are moved to their closed position, an intermediate phase of motion wherein said grabbers remain in their closed position and move in a linear direction away from said blade means, an ending phase of motion where said first and second grabbers are again moved to their open position, and a return phase of motion wherein said first and second grabbers are moved in a linear direction until they are again adjacent said blade means.

23. A system according to claim 22 wherein said actuator means further comprises a power source.

24. A system according to claim 23 wherein said power source is mechanical.

25. A system according to claim 24 wherein said power source is hydraulic.

26. A system according to claim 25 wherein said power source is pneumatic.

27. A system according to claim 5 wherein said first blade and said second blade are linear and are in fixed position with the narrow channel formed between the cutting edges of each respective blade.

28. A method of removing a tendon from surrounding muscle tissue without tearing or damaging said tissue, comprising
placing a portion of the tendon within a narrow channel formed within a blade means having a sharp cutting edge which substantially surrounds the tendon portion within the narrow channel, and
pulling the tendon within the narrow channel together with the surrounding muscle tissue past the cutting edge such that the muscle tissue is cut from the tendon.

29. A method according to claim 28 further including the step of grasping an end of the tendon in a grasping means prior to the step of pulling the tendon past the cutting edge means, and said step of pulling the tendon past the cutting edge includes moving the grasping means in a linear direction away from said blade means.

30. A method according to claim 28 wherein said step of placing a portion of the tendon into a blade means further includes placing said portion of the tendon in a channel in said blade means by guiding said portion of the tendon through a channel access means.

31. A method according to claim 29 wherein the linear movement of said grasping means comprises
a beginning phase of motion which includes moving said grasping means from an open position wherein an end of said portion of the tendon is placed therein, to a closed position wherein said end portion of the tendon is securely grasped therein,
an intermediate phase of motion wherein the grasping means is moved in a linear direction away from said blade means,
an ending phase of motion wherein said grasping means are moved from their closed position to their open position, and a return phase of motion wherein the grasping means is moved in a linear direction back toward said blade means.

32. A method according to claim 31 wherein said step of placing a portion of the tendon into a blade means further includes moving a portion of said blade means to an open position wherein said portion of the tendon can be placed into the blade means, and said step of pulling the tendon past the cutting edge means also includes moving said portion of said blade means back into the closed position.

33. A method according to claim 28 wherein said cutting edge means further comprises cutting wings and the step of pulling the tendon past the cutting edge means also causes the cutting wings to sever muscle tissue.

* * * * *